(12) United States Patent
Rathore

(10) Patent No.: US 10,837,832 B2
(45) Date of Patent: Nov. 17, 2020

(54) SPECTROMETER AND METHOD FOR MEASURING THE SPECTRAL CHARACTERISTICS THEREOF

(71) Applicant: TESTRIGHT NANOSYSTEMS PVT. LTD., Delhi (IN)

(72) Inventor: Shubham Rathore, Ghaziabad (IN)

(73) Assignee: TESTRIGHT NANOSYSTEMS PVT. LTD., Delhi (IN)

(*) Notice: Subject to any disclaimer, the term of this patent is extended or adjusted under 35 U.S.C. 154(b) by 0 days.

(21) Appl. No.: 16/479,573

(22) PCT Filed: Jan. 19, 2018

(86) PCT No.: PCT/IB2018/050333
§ 371 (c)(1),
(2) Date: Jul. 19, 2019

(87) PCT Pub. No.: WO2018/138609
PCT Pub. Date: Aug. 2, 2018

(65) Prior Publication Data
US 2019/0368934 A1 Dec. 5, 2019

(51) Int. Cl.
*G01J 3/02* (2006.01)
*G01J 3/28* (2006.01)
*G01J 3/18* (2006.01)

(52) U.S. Cl.
CPC ............ *G01J 3/2823* (2013.01); *G01J 3/021* (2013.01); *G01J 3/0208* (2013.01); *G01J 3/1804* (2013.01)

(58) Field of Classification Search
CPC ........ G01J 3/0208; G01J 3/021; G01J 3/1804; G01J 3/2803; G01J 3/2823

USPC ......................................... 356/328, 326, 300
See application file for complete search history.

(56) References Cited

U.S. PATENT DOCUMENTS

| | | |
|---|---|---|
| 3,572,933 A | 3/1971 | Boostrom |
| 4,310,244 A | 1/1982 | Perkins |
| 5,192,981 A | 3/1993 | Slutter |
| 5,497,231 A | 3/1996 | Schmidt |
| 5,880,834 A * | 3/1999 | Chrisp ............... G01J 3/02 356/305 |
| 6,081,331 A | 6/2000 | Teichmann |
| 6,122,051 A | 9/2000 | Ansley |
| 6,507,398 B1 | 1/2003 | Arai |
| 6,744,505 B1 * | 6/2004 | Wang ............... G01J 3/02 356/326 |
| 6,862,092 B1 * | 3/2005 | Ibsen ............... G01J 3/00 356/328 |
| 7,180,590 B2 | 2/2007 | Bastue |
| 7,239,386 B2 | 7/2007 | Chrisp |

(Continued)

*Primary Examiner* — Sunghee Y Gray
(74) *Attorney, Agent, or Firm* — Sinorica, LLC

(57) ABSTRACT

Spectrometer and Method for Measuring the Spectral Characteristics thereof. The present invention provides an improved spectrometer and method for measuring the spectral characteristics of an object using the spectrometer. The spectrometer uses single aberration-corrected lens or mirror system such that the light passes through or reflects off that component only once. The lens or mirror system includes a plurality of different lens or mirror that may or may not be made up of different materials which act as one single system and wherein the lens or mirror are aligned such that the different wavelengths contained in the input signal are focused on one plane.

11 Claims, 8 Drawing Sheets

(56) References Cited

U.S. PATENT DOCUMENTS

| | | | |
|---|---|---|---|
| 2005/0073680 A1* | 4/2005 | Chrisp | G01J 3/2823 356/328 |
| 2008/0204711 A1* | 8/2008 | Harrison | G01J 3/0208 356/51 |
| 2009/0091754 A1* | 4/2009 | Zhang | G01J 3/0291 356/326 |
| 2010/0277732 A1* | 11/2010 | Xiang | G01J 3/18 356/328 |
| 2012/0002202 A1* | 1/2012 | Chrisp | G01J 3/0208 356/328 |
| 2012/0188541 A1* | 7/2012 | Demmer | G01J 3/18 356/326 |
| 2013/0176564 A1* | 7/2013 | Wang | G01J 3/02 356/326 |
| 2015/0021480 A1* | 1/2015 | Chrisp | G01J 3/0208 250/339.05 |

* cited by examiner

SPECTROMETER AND METHOD FOR MEASURING THE SPECTRAL CHARACTERISTICS THEREOF

FIELD OF THE INVENTION

The present invention relates generally to the field of spectroscopy and more particularly relates to apparatus and method for measuring spectral characteristics of an object.

BACKGROUND OF THE INVENTION

A spectrometer is an instrument used to probe a property of light as a function of its portion of the electromagnetic spectrum, e.g. for spectrally resolving the light. The term 'light' or 'radiation' as used herein includes forms of electromagnetic radiation such as, but not limited to, visible, infrared and/or ultraviolet radiation. Typically, a spectrometer comprises reflection and/or refraction optics for guiding and shaping the light as well as a dispersion element such as a grating and/or prism for refracting, diffracting and/or dispersing the light in a wavelength dependent angle. In certain cases, a reflection dispersion element is also used. Depending on the angle, different spectral components of the light can be imaged at different locations along a spectral axis in an imaging plane of the spectrometer. A sensor can be arranged for detecting spectral components of the light in the imaging plane.

A conventional spectrometer lens design practice operates on the assumption that a slit is the object, a dispersive element is sandwiched between a collimating lens and an imaging lens, and an image is formed on a detector oriented perpendicular to the optical axis. The resultant image that is formed consists of multiple images of the slit that are spread out in the colour direction. Each slit image corresponds to a different wavelength. Two aberrations or distortions are commonly found in these designs. One distortion may be termed "chromatickeystone"—an effect that causes a line of each colour to differ in length depending on where the ray propagates with respect to the center of the lens. The second distortion caused by these designs is curvature of the slit, so that light of a single colour does not form a straight line, but is instead curved up ("smile"), or down ("frown"). This distortion arises at the dispersing element when the ray bundles exit the dispersing element at compound angles relative to the flat surface. Often, the amount of curvature varies with wavelength. It would be of great advantage to provide an optical system in which both of these distortions are removed.

Representatives of the art can be categorized in accordance of their construction features associated with spectrometers: lens spectrometers, mirror spectrometers, spectrometers of simple construction, and compact spectrometers.

Representative of the art for lens spectrometers is U.S. Pat. No. 3,572,933 (1971) to Boostrom, which discloses a monochromator of classical configuration comprising a collimating lens, a transmission grating and a focusing lens to form spectra. U.S. Pat. No. 5,497,231 (1996) to Schmidt discloses another lens monochromator of scanning feature, which relies on a reflection planar grating. U.S. Pat. No. 6,122,051 (2000) to Ansley discloses another lens spectrometer of multi slits, which uses a prism as dispersion element. U.S. Pat. No. 7,180,590 (2007) to Bastue et al. discloses another lens spectrometer of transmission path, which is independent of temperature-induced wavelength drift.

Representative of the art for mirror spectrometers is U.S. Pat. No. 5,192,981 (1993) to Slutter et al., which discloses a monochromator of Czerny-Turner geometry comprising a collimating mirror, a reflection grating and a focusing mirror. This configuration is one of those typical of early prior art efforts and is a technique that is generally well known. The improvement of the disclosure comprises the use of a single toroidal collimating mirror in the system in combination with a spherical focusing mirror to minimized optical aberrations within final spectral images.

Another representative of the art for mirror spectrometers is U.S. Pat. No. 6,507,398 (2003) to Arai et al., which discloses a spectrometer of crossed Czerny-Turner geometry where the incident beam and the reflected beam from the diffraction grating cross. Cross Czerny-Turner configuration becomes one of preferred considerations for compact spectrometer designs.

Another representative of the art for mirror spectrometers is U.S. Pat. No. 4,310,244 (1982) to Perkins et al., which discloses a monochromator of Fastie-Ebert geometry comprising a big mirror for both collimating and focusing, plus a reflection planar grating. Fastie-Ebert configuration evolves from that of Czerny-Turner by combining the two mirrors into one. It becomes a preferred choice for a design of simple construction, as disclosed by U.S. Pat. No. 6,081,331 (2000) to Teichmann, which describes a spectrometer of Fastie-Ebert geometry formed in a cylinder body of glass. U.S. Pat. No. 7,239,386 (2007) to Chrisp et al. also discloses a design of imaging spectrometer of Fastie-Ebert configuration, which is improved by a glass-immersed mirror and a glass-immersed grating. This modification provides extra optical power to compensate optical aberrations.

As stated above, conventional spectrometers are cumbersome and have large volumes, including those spectrometers of a single concave grating. Moreover, the existing spectrometers typically use at least 2 optical components—at least 2 lenses or mirrors, or at least one lens and one mirror, wherein generally at least one component is placed before Diffraction Grating, and at least one component is placed after Diffraction Grating. Even in the configurations where only one component is used, light reflects off or passes through that component at least twice. For example: in Fastie-Ebert configuration. The conventional configurations not only increase the chances of relative misalignment between the components but also increase the stray light (random reflections) in the system, since light has to interact with more components.

There is yet a desire for an improved spectrometer that is simple in design and involves less number of components. In particularly, a need exists for a simple design of a spectrometer which reduces the costs, time and labour involved in manufacturing spectrometers without compromising much on the image quality.

SUMMARY OF THE INVENTION

In an embodiment, an apparatus for measuring the spectral characteristics of an object is provided. The apparatus comprises:

a slit positioned for receiving light reflected and/or transmitted by said object and for diverging said light;

an aberration-corrected optical system for receiving said diverging light signals from said slit, said aberration-corrected optical system including a plurality of optical elements, wherein said optical elements are aligned in said aberration-corrected lens system such that the different wavelengths contained in the input signal are focused at one plane;

a dispersion element for receiving said different wavelengths contained in the input signal from said aberration-corrected optical system and dispersing said different wavelengths to form separately focused signals at one plane; and a detector for detecting each of said focused signal; wherein said detector detects each of said focused signal and generates a corresponding output signal correlative to the spectral characteristics of the object.

In another embodiment, for measuring the spectral characteristics of an object is provided. The method includes:

directing an input light signal from a light source onto a slit, said slit diverging said input light signal;

directing said diverging light signal onto an aberration corrected optical system, said aberration corrected optical system including a plurality of optical elements wherein said optical elements are aligned in said aberration-corrected lens system such that the different wavelengths contained in the input signal are focused at one plane;

directing the input signal from the aberration corrected optical system onto a dispersion grating for forming dispersed signals;

directing said dispersed signals onto detector such that the different wavelengths are focussed in a straight line onto the detector; and determining said spectral characteristic of the object from said focused dispersed signals.

It is an object of the invention to provide an improved spectrometer that is simple in design and involves less number of components.

It is another object of the invention to provide a simple design of a spectrometer that uses single aberration-corrected lens or mirror and light passes through or reflects off that component ONLY once.

It is another object of the invention to provide a simple design of a spectrometer which reduces the costs, time and labour involved in manufacturing spectrometers without compromising much on the image quality.

It is another object of the invention to provide a simple design of a spectrometer that reduces the stray light in the system.

It is another object of the invention to provide a simple design of a spectrometer that reduces aberrations in comparison to the existing spectrometers.

It is another object of the invention to provide a simple design of a spectrometer that reduces the chances of mis-alignment by using lesser number of components.

It is another object of the invention to provide a simple design of a spectrometer is easy to manufacture and which can be calibrated quickly.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF FIGURES

These and other features, aspects, and advantages of the present invention will become better understood when the following detailed description is read with reference to the accompanying drawings in which like characters represent like parts throughout the drawings, wherein.

Figure 1:
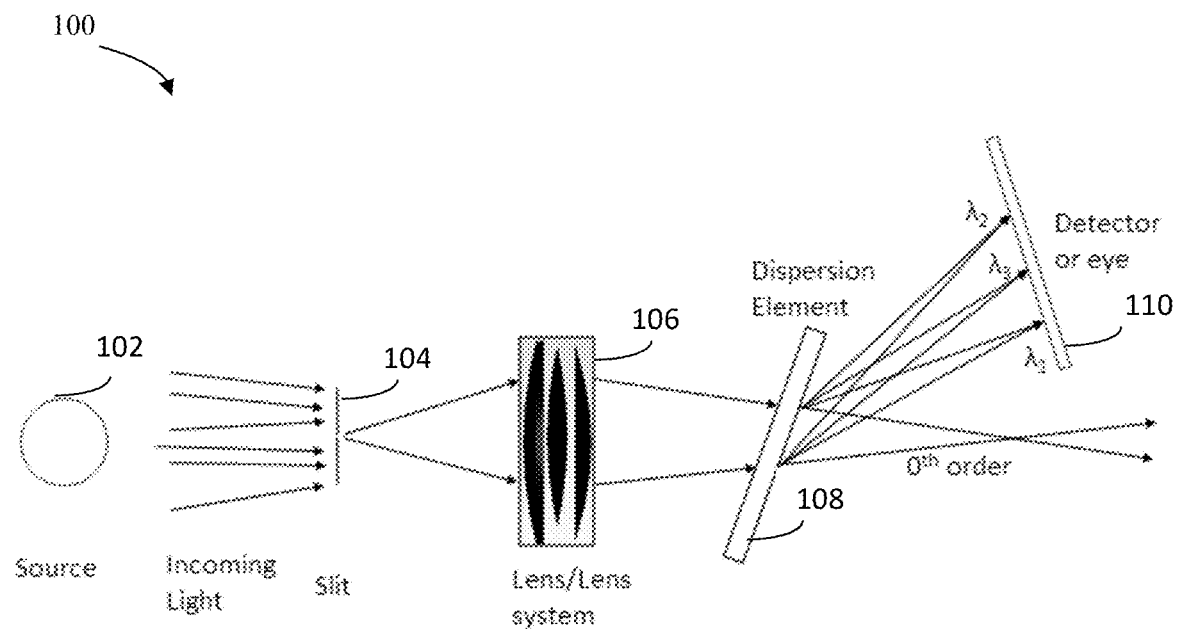
FIG. 1 shows a layout of a spectrometer in accordance with an embodiment of the invention.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying drawings.

The spectrometer as disclosed in the present invention is generally used for determining the optical characteristics of an object. The optical characteristics to be determined include, for example, reflection, transmission, or absorption spectra. Knowing the optical characteristics of an object is advantageous for any number of practical applications. For example, a user may desire to know the color of items such as paint, fabric, glass, hair coloring, etc. For color matching applications, the object may be a painted wall, a piece of furniture, a rug, a set of drapes, an article of clothing, a glass window, a painted automobile fender, hair, etc. Because the reflection spectra of a plant leaf is indicative of the health of the plant, the object also may be a plant leaf. The spectrometer may be used in a factory for quality control of inventory. For example, spectrometer may be used to compare the "whiteness" of newspaper. Reflection spectra also may be used to characterize solar reflecting glass, transmission of sunglasses, specialized mirrors and many other materials.

The optical characteristic of interest for the examples cited above is reflection spectra. The spectrometer of the present invention also can be used to determine transmission spectra. For example, the object may be an optical filter whose bandwidth is to be determined. Looking at an output of amplitude of reflected energies versus wavelength, a user can surmise that when the amplitude at a particular wavelength is zero, the filter passed that wavelength. Thus, the output informs the user as to which wavelengths were transmitted or filtered and which wavelengths were not. Transmission spectra is relevant in characterizing optical filters, camera lenses, fiber optics, and many other materials. The spectrometer can also be used for determining emission spectra. For eg., checking the spectral output of LED, flame spectroscopy, studying emission lines of various elements and so on.

Absorption spectrum is another measurable characteristic. Knowing the absorption spectrum characteristics of a material may be relevant in identifying elements such as the chemical components of a mixture or the types of gases in the atmosphere. Absorption spectrum also is relevant for analyzing fluids in the medical field.

The above are simply a few examples of the many applications in which the present invention may be employed.

Referring to FIG. 1, a layout of a spectrometer in accordance with an embodiment of the invention is illustrated. The spectrometer 100 is positioned at a sufficient distance (such that the light reaches the slit) from an object whose spectral characteristics are to be measured. In order to form an object generated input signal, object is illuminated by a light external source 102. Light source 102 may be any source comprised of a single like laser, or plurality of wavelengths of energy, including, for example, a white light source, ambient light, flame, starlight, single or combination of LEDs or a combination of all of the previously stated sources etc. Each wavelength of energy will be in whole or in part reflected, transmitted or absorbed or emitted (in case of fluorescent objects) by object. Light reflected and/or transmitted by object passes onto a slit 104. After passing through the slit 104, the input signal diverges onto a lens system 106. The lens system 106 typically includes but not necessarily a plurality of different lenses that may be made up of different materials which act as one single system. The lens system 106 forms an aberration-corrected lens system. In an embodiment, individual lens need not be aberration corrected, the whole system of lenses as a whole is made aberration corrected. Aberration for which corrections are done in the lens include, but not limited to, defocus, Astigmatism, Tilt, Spherical aberrations, coma, distortion, petzval field curvature, chromatic aberrations, etc., or a combination of these. The lenses are aligned in the lens system 106 such that the different wavelengths contained in the input signal are focused at one plane. Also, the lenses in the lens system 106 are such that the image formed by them is free of any aberration. The present optical system 106 removes chromatic aberration that is caused when a normal lens is used. Moreover, the present lens system 106 is cost effective in comparison to a lens used for covering the wide angle of rays emerging through the slit 104.

Figure 2A:
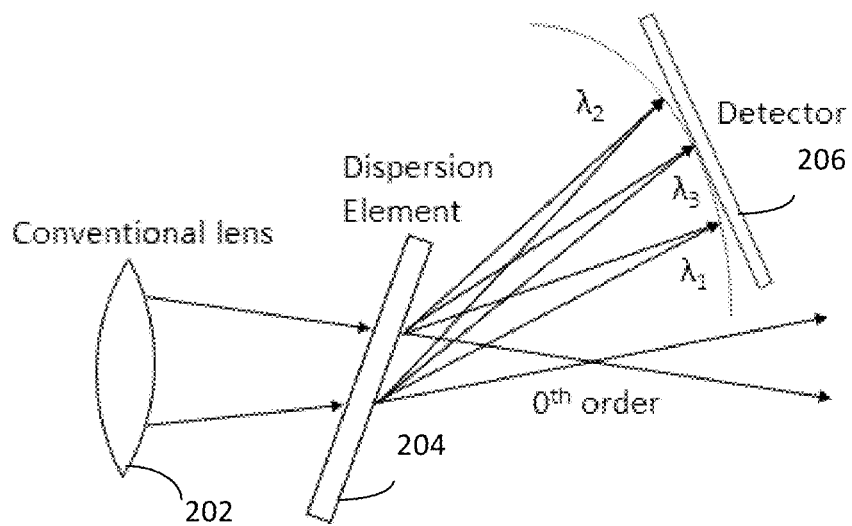
FIG. 2a) shows a ray diagram indicating the dispersion of the input signal in accordance with the prior art.
Figure 2B:
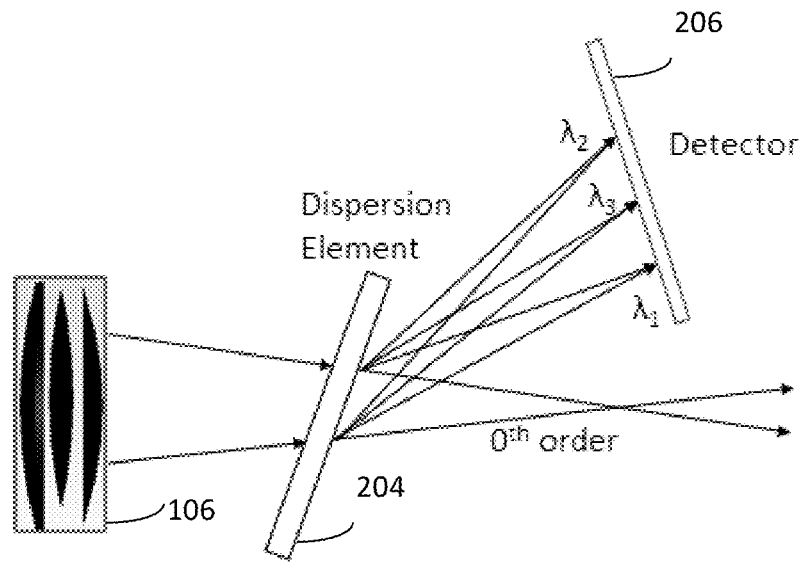
FIG. 2b) shows a ray diagram indicating the dispersion of the input signal in accordance with an embodiment of the invention.

The lens system 106 directs the input signal onto a dispersion element 108. The dispersion element 108 is typically a diffraction grating. Diffraction grating may be any conventional diffraction grating, such as an etched grating or a holographic diffraction grating. Compact disks (CDs and DVDs) which are also a type of replicated holographic diffraction grating can also work. As the skilled artisan will appreciate, dispersion element 108 groove (line) spacing will determine the angular dispersion of the resulting spectrum. The grating spacing, thus, will be chosen to provide the desired resolution of the device. For example, diffraction grating may be a luminized blaze grating having about 600 lines per mm. Using such a diffraction grating, spectrometer 10 has a resolution of between about 0.5 nm to about 2 nm. The dispersion element 108 disperses the input signal to form dispersed signals which are directed to the detector 110. As used herein, "dispersed signal" means a signal comprised of a single wavelength of energy or a range of wavelengths of energy. The lens system 106 causes the input signal to be directed such that the different wavelengths of the input signal are focused on a single detector plane. Referring to FIG. 2a), a ray diagram indicating the dispersion of the input signal in accordance with the prior art system is illustrated. It can be clearly noticed that when the input signal directed by a single lens (convex) 202 or mirror (concave, torroidal, etc.) passes through the dispersion element 204, the dispersion element causes the different wavelengths ($\lambda 1$, $\lambda 2$, $\lambda 3$,) to focus on the detector 206 in the shape of an arc. Therefore, a single lens won't be able to focus the different wavelengths onto the detector. If one wavelength is brought in focus, other wavelengths go out of focus, thus reducing the resolution. Referring to FIG. 2b), a ray diagram indicating the dispersion of the input signal in accordance with the present invention is illustrated. It can be clearly noticed that when the present lens system 106 (as referred in FIG. 1) is used, the dispersion element 204 causes the different wavelengths ($\lambda 1$, $\lambda 2$, $\lambda 3$,) to focus on the detector 206 in a straight line. The aberration corrected lens system 106 as used in the preset invention is able to focus different wavelengths on a single detector plane crisply to provide a sharp resolution that helps in a clear analysis. The detector 206 detects the dispersed signals and analyzes, or processes, each diffracted signal and generates a corresponding output signal correlative to the spectral characteristics of the object. For example, the detector 206 may include a means which detects the amplitude or intensity of each selected diffracted wavelength signal. The detector 206 may be comprised of a plurality of components, each of which performs one or more of the detector's 206 functions. For example, the detector 206 may comprise a sensing means for detecting signals, and a recorder, microprocessor, or the like for storing, processing data, and transmitting data. Detector can be a CCD sensor, or a CMOS sensor (either 1-D or 2-D) with plurality of pixels or an array of photo sensors. The detector 206 may include circuitry for amplifying received signals and for converting signals into a particular format, such as that conventional for transmission via a wired transmission (like USB or FireWire) port or wireless. By providing a wired or wireless port, the spectrometer can be connected to a computer, tablet, mobile or dedicated display (display screen can be built on the device itself) and signals converted to a wired or wireless format may be transmitted to the computer where, with the appropriate software, the received data may be analyzed, stored, and displayed.

Figure 3:
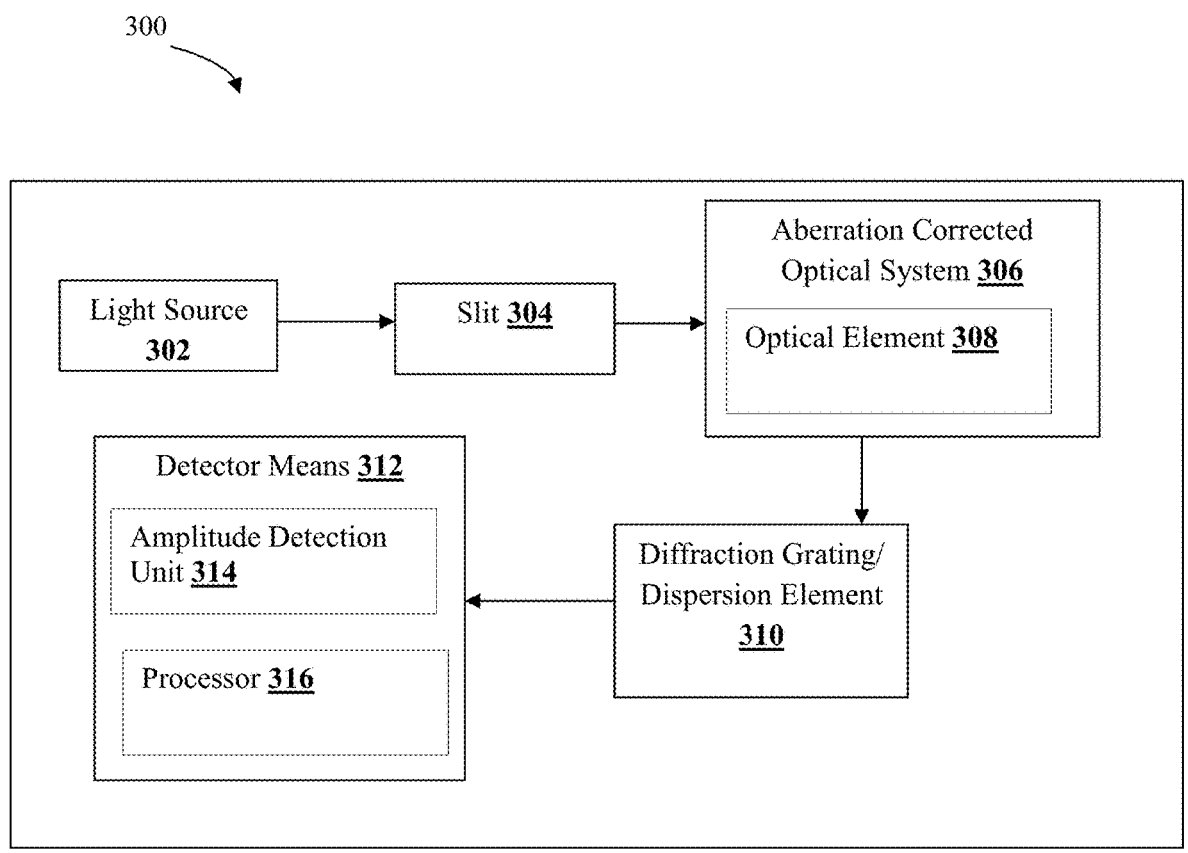
FIG. 3 illustrates an apparatus for measuring the spectral characteristics of an object accordance with an embodiment of the invention.

Referring to FIG. 3, a block diagram of the apparatus for measuring the spectral characteristics of an object is provided. The apparatus 300 includes a light source 302 for illuminating said object whose spectral characteristics are to be measured. The optical characteristics to be determined include, for example, but not limited to, reflectivity, transmissivity, or absorptivity or emissivity. Knowing the optical characteristics of an object is advantageous for any number of practical applications. For example, a user may desire to know the color of items such as paint, fabric, glass, hair coloring, etc. The light for illuminating the object light may come from any suitable source, for example a lamp such as a mercury vapor lamp, a light emitting diode or the like, an incandescent sample, and may be provided to optical aperture in any suitable manner, including directly, via light pipe, lens, mirror, or other suitable light conduit. However, an optical fiber is preferred. The sample light will usually be a complex mixture of wavelengths, for example, such as are produced by hot body radiation, or particles or gases in a plasma, but in certain cases it is contemplated, that the invention may have use for calibrating, detecting or measuring substantially monochromatic light. Typical sample sources are industrial materials, such as the steel slag samples referenced above, raised to a sufficient temperature to emit characteristic elemental spectra. The inventive spectrometer is well suited to examination of such spectra. Other suitable sample sources are many, as will be apparent to those skilled in the art.

The apparatus 300 further includes a slit 304 positioned for receiving the light reflected and/or transmitted or emitted by said object and for diverging said light. An aberration-corrected optical system 306 is provided for receiving said diverging light signals from said slit, said aberration-corrected optical system including a plurality of optical elements 308, wherein said optical elements are aligned in said aberration-corrected lens system such that the different wavelengths contained in the input signal are focused at one plane. Aberration for which corrections are done in the optical element include, but not limited to, defocus, Astigmatism, Tilt, Spherical aberrations, coma, distortion, petzval field curvature, chromatic aberrations, etc., or a combination of these. For purposes of this disclosure, an optical element 308 is a component that performs at least one optical function. However, an optical element 308 member may include a plurality of optical elements that are integrated to perform one or more optical functions. (i.e., first collimating, second collimating, dispersing, first focusing, and second focusing).

In an embodiment, the optical elements 308 forming said aberration corrected optical system 306 include one or more are of lenses or mirrors or combinations thereof.

In an embodiment, the optical elements 308 forming said aberration corrected optical system 306 includes one or more are of lenses or mirrors or combinations thereof.

In an embodiment, the optical elements 308 optical elements are made up of same or different material and specification.

In an embodiment, the optical elements 308 include one or more of:
a. a stop;
b. a negative meniscus shape lens with its convex surface facing an object side or image side;
c. a positive meniscus shape lens with its concave surface facing an object or image side;
d. a positive lens having at least one of a spherical, aspherical or plano cross-section;
e. a negative lens having at least one of a spherical, aspherical or plano cross-section;
f. a concave cylindrical mirror of spherical cross-section; and
g. a concave cylindrical mirror of aspherical cross-section.

In an embodiment, the aberration corrected optical system 306 includes:
a first lens group including a biconcave lens;
a second lens group including two lenses whose convex surfaces are arranged opposite to each other, the second lens group having a positive refraction power as a whole;
a third lens group including a biconcave lens; and
a fourth lens group including two lenses whose convex surfaces are arranged opposite to each other, the fourth lens group having positive refraction power.

In an embodiment, the aberration-corrected optical system 306 satisfies conditional expressions (1) and (2):

$$0.21 < BF/L < 0.43 \tag{1}$$

$$N_4 > 1.8 \tag{2}$$

wherein BF represents a back focal length BF of the aberration-corrected optical system 306, L represents a length L in an optical axial direction from a surface of the aberration-corrected optical system 306 nearest to an object to a surface of the aberration-corrected optical system 306 nearest to an image, and $N_4$ represents a refraction index of the third lens group at the d-line.

The apparatus 300 further includes a dispersion element/grating 310 for receiving the different wavelengths contained in the input signal, that are focused at one plane, from said aberration-corrected lens system 306 and dispersing said different wavelengths to form to form separately focused signals at one plane. A preferred embodiment of dispersion grating 310 is a holographic, blazed rectangular grating. Alternatively, a classically ruled grating may be employed, if desired, and the dimensions of either classical or holographic gratings preferred for use in the invention may vary. In an embodiment, a prism or grism can also be used. For example, the length and width may each lie between about 15 mm and about 400 mm. Alternatively also, a circular grating having a diameter within similar size limits may be employed. The grating thickness can vary widely, for example, between about 3 mm and about 25 mm.

Grooves in grating 310 are oriented perpendicular to axis so that incident light is diffracted in patterns extending transversely to the plane. Preferably, the groove density is about 900 grooves per millimeter ("gr/mm" herein), but other groove densities may be employed, as is known in the art, depending upon the desired operating wavelength range and resolution. Thus, preferred embodiments of grating may have groove densities between about 100 and about 6000 grooves/mm.

Preferably also, grating 310 is blazed at an application-specific wavelength. Different blaze characteristics may be employed according to the desired wavelength to be selected, to provide enhanced efficiency at a desired wavelength. For example, classically ruled gratings can be blazed at wavelengths of from about 250 nm, in the ultraviolet, to about 5000 nm, in the infrared. Holographic gratings can be optimized with spectral bands lying between about 150 nm, in the low ultraviolet, to about 10,000 nm (10 micron), in the near infrared.

Suitable gratings for use in the practice of the invention, such as grating 310, can be manufactured by thin film casting from a master grating, using an organic film material. The cast film is bonded to an appropriate substrate and reflectorized. The master grating can be produced in a holographic process wherein the grating pattern is defined by means of interfering light patterns, produced from laser sources, which are projected on to a suitable hard substrate coated with photoresist film. After exposure, the pattern is etched into the substrate. Blazing, which entails shaping the grooves of the grating, is accomplished by means of a chemical etch, possibly followed by an ion etch to achieve a desired blaze shape.

In an embodiment, the aberration corrected optical system 306 may be is placed before or after the diffraction grating 310.

The apparatus 300 further includes a detector means 312 for detecting each of said focused signal, wherein the detector means 312 detects each of said focused signal and generates a corresponding output signal correlative to the spectral characteristics of the object. The detector means 312 further includes amplitude detection unit/means 314 for detecting amplitude or intensity of each selected diffracted wavelength signals. The detector means 312 further includes a processor 316 for receiving, processing, associating, and transmitting said spectral characteristics and said corresponding focused select focused signals at one plane. The detector means 312 may be comprised of a single component which performs all of the functions described above. Alternatively, the detector means 312 may be comprised of a plurality of components, each of which performs one or more of the detector means 312's functions. For example, the detector means 312 may comprise a detector for detecting signals, and a recorder, microprocessor, or the like for storing, processing data, and transmitting data. The detector means 312 may include circuitry for amplifying received signals and for converting signals into a particular format, such as that conventional for transmission via a USB or FireWire port. By providing a USB or FireWire port, the apparatus 300 can be connected to a computer, tab or mobile phone and signals converted to a USB or FireWire format may be transmitted to the computer where, with the appropriate software, the received data may be analyzed, stored, and displayed. Whether comprised of a single component or multiple components, detector means 312 may be wholly or only partially contained within housing.

In an embodiment, the detector means 312 includes one or more of:
 a. a single movable photodiode;
 b. stationary photodiode couple with movable grating; and
 c. an array of photodiodes or an image sensor.
 d. Biological eye.

In the preferred embodiments, the invention can operate at a wavelength, or spectral band, in the range of from about 350 to about 2400 nm. However, other embodiments of the novel spectrometer described herein can be provided for use with light of any desired wavelength, or with radiation at other suitable wavelengths, by appropriate selection of the specifications of optical elements of the system, by appropriate modifications of the system geometry and by other appropriate design modifications, as will be apparent to those skilled in the art. Such other embodiments can operate, for example, at selected narrower spectral bands within a broader wavelength range of from about 200 nm to about 3 micron, or even from about 10 nm to about 10 micron.

The inventive spectrometer can be contained within a light-tight housing which excludes as much stray light as practical from the housed optical elements 308. The housing should be robust and durable to protect the optics during use and should be sufficiently rigid to maintain a proper geometric relationship between the optical elements. The housing can be internally journaled to support grating 310 for rotation, and shaped to accommodate such rotation. Additionally the housing can have a suitable opening or openings for fiber optic bundle and may be provided external with mounting structure such as threaded extensions, unthreaded bosses, recesses or apertured flanges for attachment to other modules or equipment.

Figure 4A:
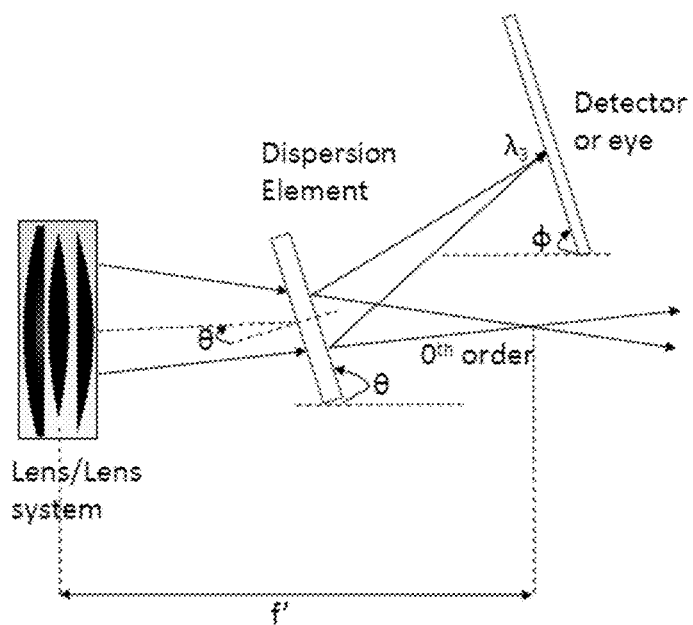
FIG. 4 (a-b) illustrate a ray diagram illustrating the use of transmission grating and reflection grating respectively in accordance with an embodiment the invention.
Figure 4B:
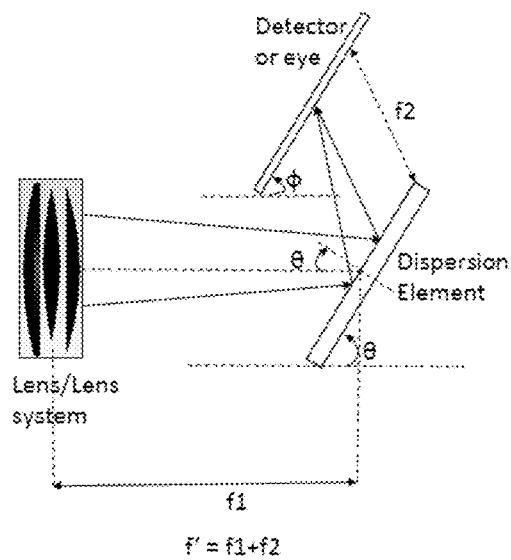

Referring to FIGS. 4a) and 4b), a ray diagram illustrating the use of transmission grating and reflection grating respectively in accordance with an embodiment is shown. In FIG. 4a), $\lambda_3$ indicates average of minimum and maximum wavelengths striking the dispersion element and reaching the detector. f' indicates the image distance from lens, if there was no grating. The relation between the incidence angle on grating (transmission or reflection) and the angle of detector plane is as below:

$$\theta = +-(e^{3.037-0.38\lambda_{avg}+3.84e^{-1.39g}-0.00036N_f}+-4°)$$

$$\phi = \theta_f +- 3°$$

wherein,
 $\theta$ = incidence angle on grating
 $\phi$ = angle of the detector plane
 $N_f$ = image distance/effective aperture = f'/effective aperture
 $\lambda_{avg}$ = average wavelength = minimum wavelength+maximum wavelength/2
 g = grating groove distance.

It has been found that for converging beam half angle of 5.5 degrees falling on the grating, best results are obtained at incident angles 38-52 degrees and detector should be placed between 35-55 mm from the grating at an angle −10 to +10 with respect to the grating.

Figure 5:
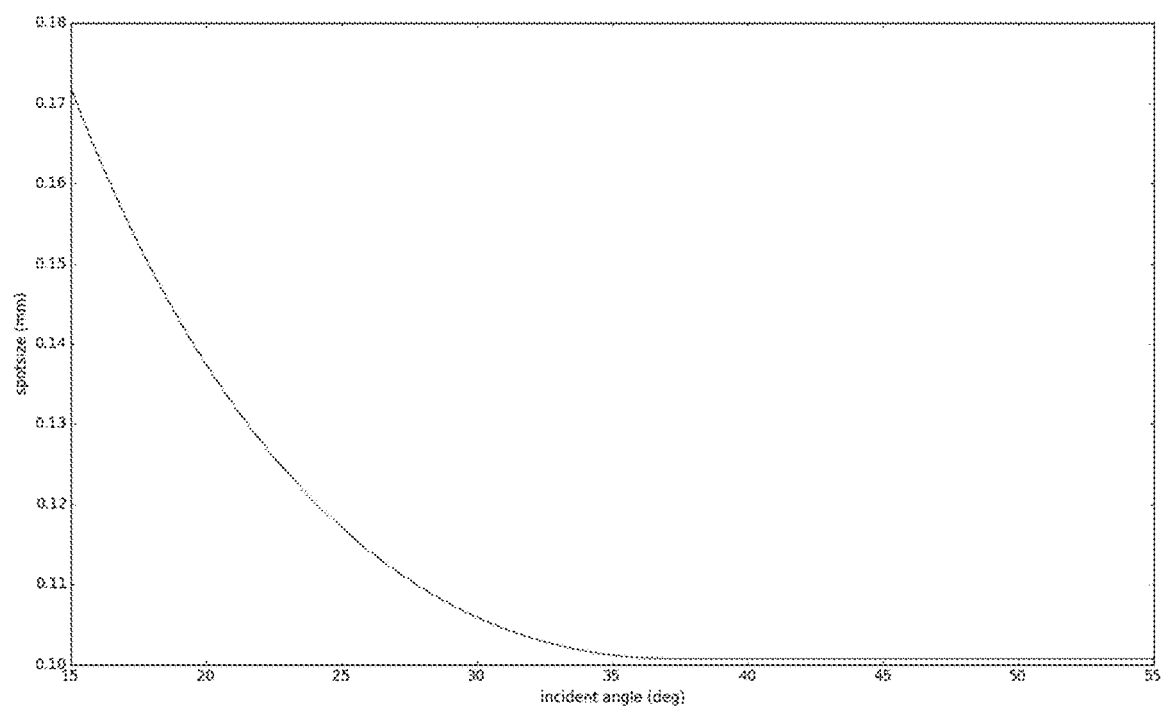
FIG. 5 illustrates a graph indicating the spot size of the wavelength 600 nm on a plane optimized for wavelengths 500 nm and 700 nm.

Referring to FIG. 5, a graph indicating the spot size of the wavelength 600 nm on a plane optimized for wavelengths 500 nm and 700 nm is illustrated. Spotsize refers to the diameter of the circle in which the light of certain wavelength focusses. It can be seen that after 36 degrees, the spot size does not fall much.

Figure 6:
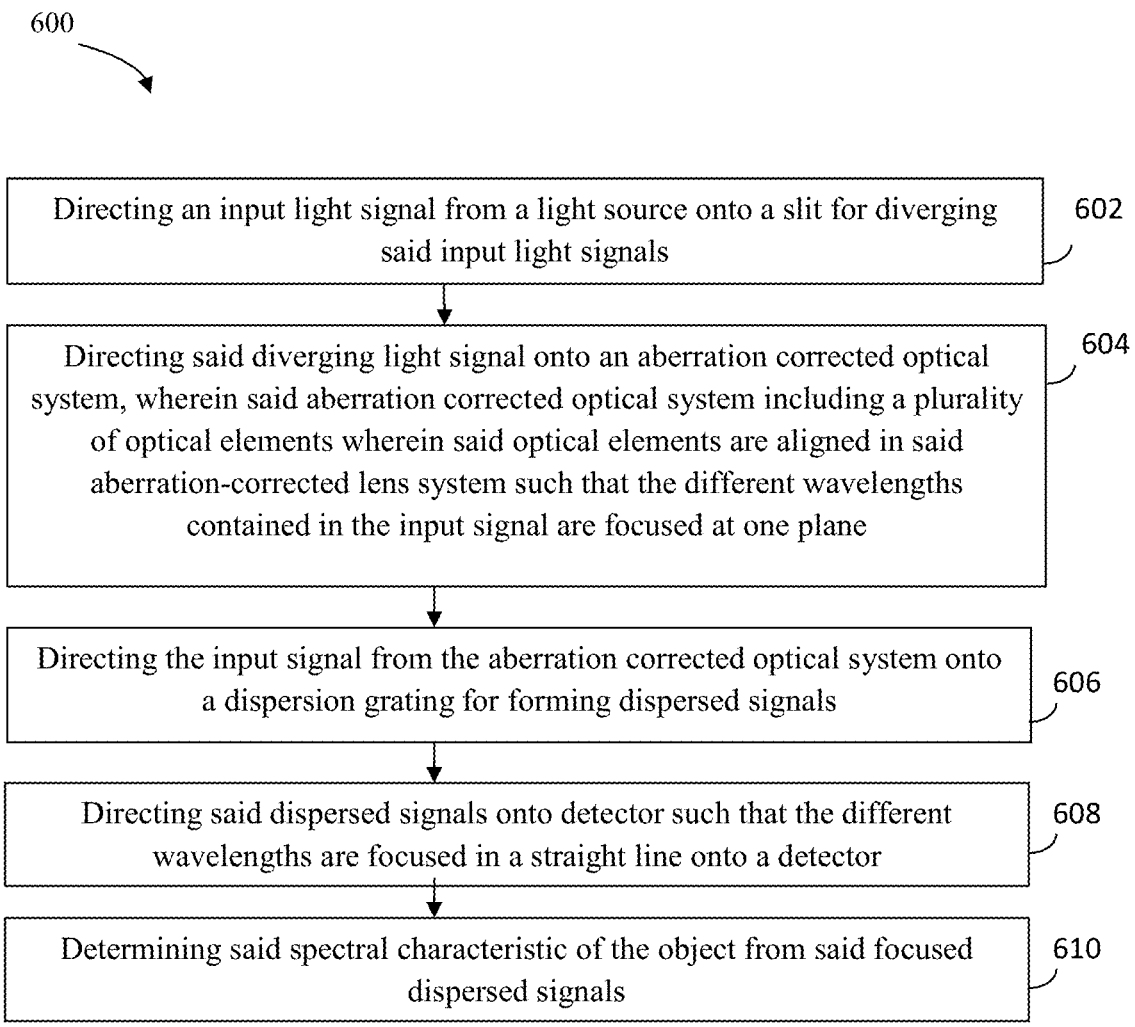
FIG. 6 illustrates a flow chart for a method for measuring the spectral characteristics of an object using the spectrometer referred in in FIGS. 1 and 3.

Referring to FIG. 6, a flow chart for a method for measuring the spectral characteristics of an object using the spectrometer referred in in FIGS. 1 and 3 is illustrated. The method 600 includes step 602 of directing an input light signal from a light source onto a slit, said slit diverging said input light signal. The diverging light signal are directed onto an aberration corrected optical system in step 604, said optical system including a plurality of optical elements wherein said optical elements are aligned in said aberration-corrected lens system such that the different wavelengths contained in the input signal are focused at one plane. Thereafter, the method 600 includes step 606 of directing the input signal from the aberration corrected optical system onto a dispersion grating for forming dispersed signals and step 608 of directing said dispersed signals onto detector such that the different wavelengths are focussed in a straight line onto the detector. The spectral characteristic of the object are determined from said focused select dispersed signals in step 610.

Figure 7:
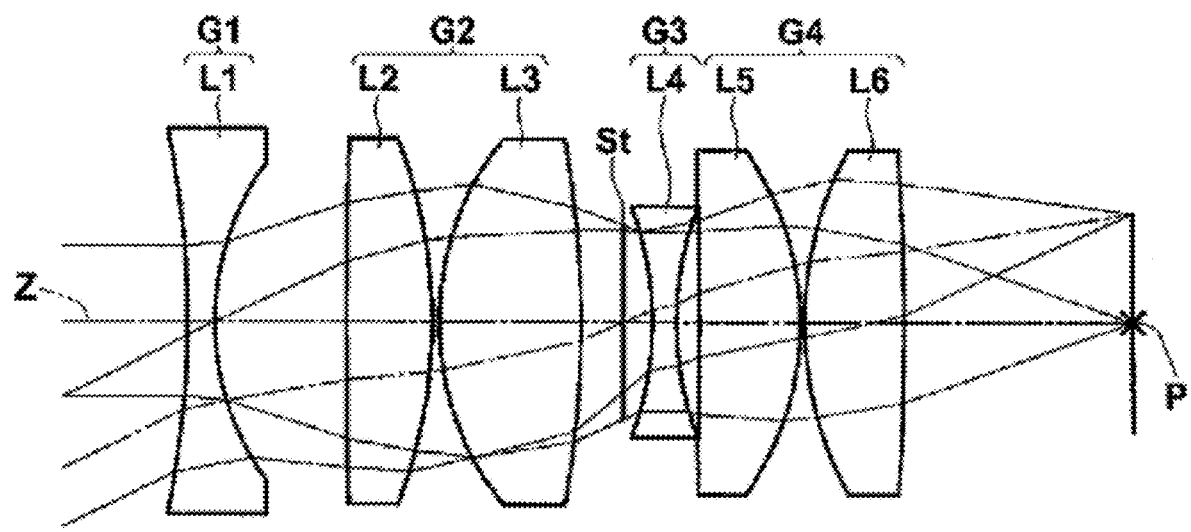
FIG. 7 illustrates a cross-sectional view of an exemplary aberration-corrected optical system in accordance with an embodiment the invention.

Referring to FIG. 7, a cross-sectional view of an exemplary aberration-corrected optical system in accordance with an embodiment the invention is illustrated. In aberration-corrected optical system 700, a first lens group G1, a second lens group G2, a third lens group G3 and a fourth lens group G4 are arranged in order from the object side along the optical axis Z. The first lens group G1 includes a biconcave lens L1, and the second lens group G2 includes two lenses L2 and L3 whose convex surfaces are arranged opposite to each other with an air space in between, and has as a whole a positive refraction power. The third lens group G3 includes a biconcave lens L4, and the fourth lens group G4 includes two lenses L5 and L6 whose convex surfaces are arranged opposite to each other with an air space in between, and has as a whole a positive refraction power. In the aberration-corrected optical system 700 as illustrated, an aperture diaphragm St is located between the second lens group G2 and the third lens group G3. However, as illustrated in numerical examples that will be described later, the position of the aperture diaphragm St in the imaging lens is not limited to that depicted in FIG. 1. The aperture diaphragm St in FIG. 1 merely represents a position, and does not indicate either shape or size. P indicates the imaging position of the system 700.

Figure 8A:
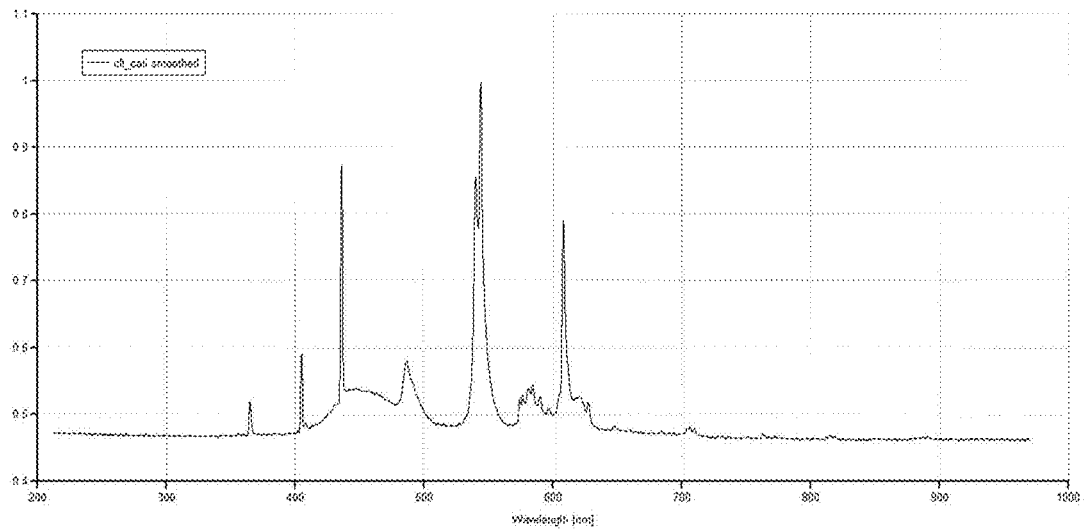
FIG. 8(a-b) is a graphical representation of one illustrative output.
Figure 8B:
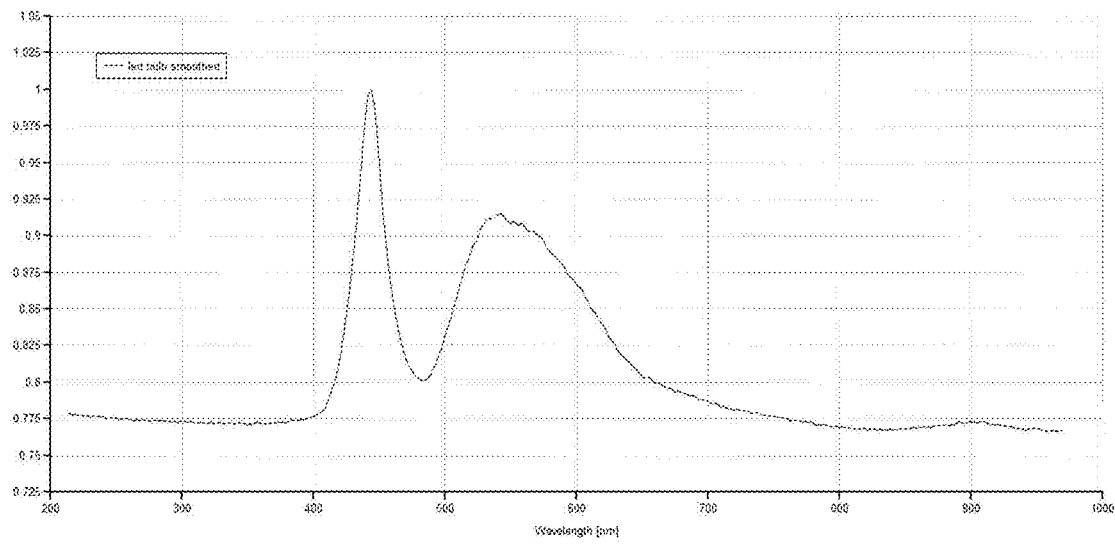

FIG. 8(a-b) is a graphical representation of one illustrative output. In this case, the diffracted signals are identified by their wavelengths. The spectral characteristic determined is the amplitude or intensity of each diffracted signal. The result is a graph of the amplitude or intensity of diffracted energy as a function of wavelength. FIG. 8(a) and FIG. 8(b) refer to the spectrum of a CFL lamp and White LED respectively. X-axis is wavelengths in nanometres (nm) and Y-axis shows the intensity of the light. The output may be presented to the user in any other format desired, e.g., a table, a graph, or the like.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature.

I claim:

1. An apparatus for measuring the spectral characteristics of an object, said apparatus comprising:
    a slit positioned for receiving light reflected, transmitted or emitted by said object and for diverging said light;
    an aberration-corrected optical system for receiving said diverging light signals from said slit, said aberration-corrected optical system including a plurality of optical elements, wherein said optical elements are aligned in said aberration-corrected lens system such that the different wavelengths contained in the input signal are focused at one plane,
    a dispersion element for receiving said different wavelengths contained in the input signal from said aberration-corrected optical system and dispersing said different wavelengths to form separately focused signals at one plane; and
    a detector means for detecting each of said focused signal; wherein said detector detects each of said focused signal and generates a corresponding output signal correlative to the spectral characteristics of the object.

2. The apparatus as claimed in claim 1, wherein said aberration corrected optical system is placed before or after the diffraction grating.

3. The apparatus as claimed in claim 1, wherein said optical elements forming said aberration corrected optical system include one or more are of lenses or mirrors or combinations thereof.

4. The apparatus as claimed in claim 1, wherein said optical elements include one or more of:
    a. a stop;
    b. a negative meniscus shape lens with its convex surface facing an object side or image side;
    c. a positive meniscus shape lens with its concave surface facing an object or image side;
    d. a positive lens having at least one of a spherical, aspherical or plano cross-section;
    e. a negative lens having at least one of a spherical, aspherical or plano cross-section;
    f. a concave cylindrical mirror of spherical cross-section; and
    g. a concave cylindrical mirror of aspherical cross-section.

5. The apparatus as claimed in claim 1, wherein said aberration-corrected optical system comprises:
    a first lens group including a biconcave lens;
    a second lens group including two lenses whose convex surfaces are arranged opposite to each other, the second lens group having a positive refraction power as a whole;
    a third lens group including a biconcave lens; and
    a fourth lens group including two lenses whose convex surfaces are arranged opposite to each other, the fourth lens group having positive refraction power.

6. The apparatus as claimed in claim 5, wherein said aberration-corrected optical system satisfies conditional expressions (1) and (2):

$$0.21 < BF/L < 0.43 \quad (1)$$

$$N_4 > 1.8 \quad (2)$$

wherein BF represents a back focal length BF of the aberration-corrected optical system, L represents a length L in an optical axial direction from a surface of the aberration-corrected optical system nearest to an object to a surface of the aberration-corrected optical system nearest to an image, and $N_4$ represents a refraction index of the third lens group at the d-line.

7. The apparatus as claimed in claim 1, wherein said detector includes one or more of
   a. a means for detecting amplitude or intensity of each selected wavelength signals; and
   b. a processor for receiving, processing, associating, and transmitting said spectral characteristics and said corresponding focused select diffracted signals.

8. The apparatus as claimed in claim 1, wherein said detector includes one or more of:
   a. a single movable photodiode;
   b. stationary photodiode coupled with movable grating;
   c. an array of photodiodes or an image sensor; and
   d. Biological eye.

9. The apparatus as claimed in claim 1, wherein incidence angle on grating satisfy and the angle of detector plane satisfy the below expression:

$$\theta = +-(e^{3.037-0.38\lambda_{avg}+3.84e^{-1.39g}-0.00036N_f}+-4°)$$

$$\phi = \theta_t +-3°$$

wherein,
   $\theta$ = incidence angle on grating
   $\phi$ = angle of the detector plane
   $N_f$ = image distance/effective aperture = f'/effective aperture
   $\lambda_{avg}$ = average wavelength = minimum wavelength+maximum wavelength/2
   g = grating groove distance.

10. The apparatus as claimed in claim 1, wherein said optical elements are made up of same or different material and specification.

11. A method for measuring the spectral characteristics of an object using the apparatus as claimed in claim 1, said method comprising:
   directing an input light signal from a light source onto a slit for diverging said input light signal;
   directing said diverging light signal onto an aberration corrected optical system, said aberration corrected optical system including a plurality of optical elements wherein said optical elements are aligned in said aberration-corrected lens system such that the different wavelengths contained in the input signal are focused at one plane;
   directing the input signal from the aberration corrected optical system onto a dispersion grating for forming dispersed signals;
   directing said dispersed signals onto detector such that the different wavelengths are focused in a straight line onto a detector; and
   determining said spectral characteristic of the object from said focused dispersed signals.

* * * * *